US010159219B2

(12) United States Patent
Van Curen et al.

(10) Patent No.: US 10,159,219 B2
(45) Date of Patent: Dec. 25, 2018

(54) ANIMAL TRAINING APPARATUS AND SYSTEM USING PLURALITY OF VIBRATION MOTORS

(71) Applicant: E-Collar Technologies, Inc., Garrett, IN (US)

(72) Inventors: Greg Van Curen, Fremont, IN (US); Ho-Sung So, Seoul (KR)

(73) Assignee: E-Collar Technologies, Inc., Garrett, IN (US)

( * ) Notice: Subject to any disclaimer, the term of this patent is extended or adjusted under 35 U.S.C. 154(b) by 253 days.

(21) Appl. No.: 15/130,192

(22) Filed: Apr. 15, 2016

(65) Prior Publication Data

US 2017/0208775 A1  Jul. 27, 2017

(30) Foreign Application Priority Data

Jan. 26, 2016  (KR) .................. 10-2016-0009643

(51) Int. Cl.
*A01K 15/04*  (2006.01)
*A01K 27/00*  (2006.01)
*A01K 15/02*  (2006.01)

(52) U.S. Cl.
CPC .......... *A01K 15/022* (2013.01); *A01K 15/023* (2013.01); *A01K 27/006* (2013.01); *A01K 27/009* (2013.01)

(58) Field of Classification Search
CPC ...... A01K 15/00; A01K 15/02; A01K 15/021; A01K 15/022; A01K 15/023; A01K 15/029; A01K 15/04; A01K 27/009; A01K 29/00
See application file for complete search history.

(56) References Cited

U.S. PATENT DOCUMENTS

| 6,131,535 | A | 10/2000 | So | |
| 6,422,992 | B1* | 7/2002 | Raffel | A61M 21/00 600/27 |
| 7,222,589 | B2 | 5/2007 | Lee, IV et al. | |
| 2007/0191913 | A1* | 8/2007 | Kim | A01K 15/021 607/60 |
| 2008/0035072 | A1* | 2/2008 | Lee | A01K 15/023 119/720 |
| 2011/0120389 | A1* | 5/2011 | Yackley | A01K 1/04 119/796 |

(Continued)

*Primary Examiner* — Thanh Pham
(74) *Attorney, Agent, or Firm* — Taylor IP, P.C.

(57) ABSTRACT

An animal training apparatus includes at least two vibration motors configured to generate the vibration stimulation and deliver the vibration stimulation to the animal, and a microprocessor comprising control logic programmed to control the at least two vibration motors to deliver the vibration stimulation to the animal when a preset condition is satisfied, wherein at least one of the vibration motors generates vibration stimulation with variable intensity, and the microprocessor controls the vibration motors to make a sum of vibration stimulation generated by the vibration motors equal a desired intensity of vibration stimulation that is determined based on the preset control logic or the satisfied condition. The animal training apparatus and system can substantially correct the animal's behavior using vibration stimulation varying in an adequate range as a main stimulation means by using the plurality of vibration motors, without using electrical stimulation.

10 Claims, 8 Drawing Sheets

(56) References Cited

U.S. PATENT DOCUMENTS

| | | | | |
|---|---|---|---|---|
| 2012/0046579 A1* | 2/2012 | Radl | ............... | A61H 11/00 601/46 |
| 2012/0310304 A1* | 12/2012 | Brockway | ............ | A61N 1/36114 607/59 |
| 2013/0239905 A1* | 9/2013 | Kim | ............... | A01K 15/021 119/720 |
| 2015/0245979 A1* | 9/2015 | Knyrim | ............ | A61H 23/0263 600/38 |
| 2015/0373951 A1* | 12/2015 | Kelly | ............... | A01K 15/021 119/719 |

* cited by examiner

FIG. 7

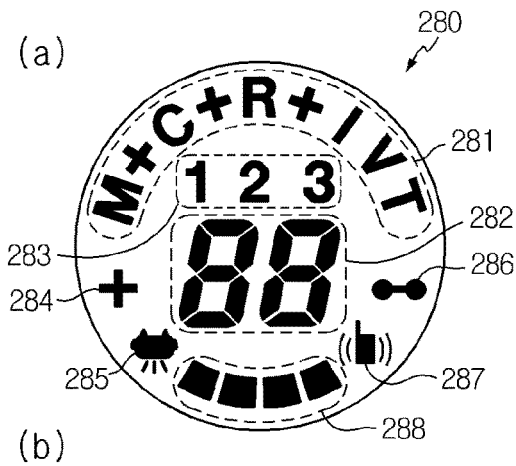

|  | Description | Remarks |
|---|---|---|
| M | Momentary Stimulation | Sends Single Pulse of Stimulation |
| M+ | Momentary Boost Stimulation | Sends Single Pulse of Boosted Stimulation |
| C | Continuous Stimulation | Sends Continuous Pulses of Stimulation |
| C+ | Continuous Boost Stimulation | Sends Continuous Pulses of Boosted Stimulation |
| R | Ramp Stimulation | Ramps Stimulation from 0 to Level Set by Dial |
| R+ | Ramp Boosted Stimulation | Ramps Stimulation from 0 to Boosted Level |
| I | Instant Stimulation | Dial Controls Stimulation for up to 30 Seconds |
| V | Vibration | Vibration |
| T | Tone | Tone can be a Warning or a Good Dog Marker |
| + | Boost Level Setting | Sets Boost Level for Each Dog |
| 🔦 | Collar Receiver Tracking Light | Turn ON/OFF Night Tracking Collar Receiver Light |
| ((▪)) | Lost Transmitter | 6 Hours Timer Setting for Lost Transmitter Beeper |
| ●—● | Pairing/Synchronizing Collar Receivers | Allows for "In the Field" Pairing of Receivers |
| 1 2 3 | Selection of Multi Dog Operation | Multi Dog Mode indicator |
| 88 | Stimulation Level Indication | 0 to 100 Levels of Precision Stimulation |
| ▮▮▮▮ | Battery Indicator | Indicates Transmitter Battery Level |

ANIMAL TRAINING APPARATUS AND SYSTEM USING PLURALITY OF VIBRATION MOTORS

CROSS-REFERENCE TO RELATED APPLICATIONS

The present application claims priority to Korean Patent Application No. 10-2016-0009643 filed in the Republic of Korea on Jan. 26, 2016, the disclosure of which is incorporated herein by reference.

BACKGROUND

The present disclosure relates to an electronic animal training apparatus and system that is worn on the body of an animal such as a dog or a cat to deliver stimulation to train the animal or correct the animal's behavior.

In the field of animal training, owners or trainers (hereinafter referred to as 'users') have employed various electric and electronic technologies in correcting animal's behavior since the late 1960s. For example, Patent Literature 1 (U.S. Pat. No. 7,222,589) discloses a collar type device having a sensor to detect a dog barking and an electrical stimulator to deliver an electrical stimulus to the dog, in which an electrical stimulus is delivered to a dog having the collar type device worn around the neck when the sensor detects the dog barking. Also, Patent Literature 2 (U.S. Pat. No. 6,131,535) discloses an animal training system including a collar type device and a remote controller possessed by a user that conducts radio-frequency wireless communications with the collar type device, in which the user takes control to deliver stimulation such as electrical stimulation to the collar type device through the remote controller when a dog does a behavior needed to correct, such as, for example, barking, going beyond a preset boundary or attacking a human.

Using such electronic animal training devices or systems, animals (typically dogs, but animals may be other pets such as cats or livestocks) are trained to do good behaviors. Also, electronic animal training devices or systems have advanced by employing electronic and communication technologies that are developing day by day, and are gaining excellent effects in training hunting dogs or pets.

Recently, with the trend of recognizing pets such as dogs or cats 'animal companions' more than merely 'pets', delivering electrical stimulation to animals is considered as animal abuse, and the way to prohibit such acts or replace electrical stimulation with other types of stimulation is being sought. In keeping with this trend, consideration is being taken of an animal training apparatus using vibration stimulation using a vibration motor or a piezoelectric device as a main stimulation means in place of electrical stimulation.

However, this vibration stimulation has lower intensity of stimulation than conventional electrical stimulation and lower effect on correction of animal's behavior, so vibration stimulation has been simply used as an auxiliary stimulation means for getting the animal's attention or encouraging or complimenting the animal when the animal did a good behavior, rather than stimulation means for scolding the animal when the animal did a bad behavior.

RELATED LITERATURES

Patent Literature
(Patent Literature 1) U.S. Pat. No. 7,222,589
(Patent Literature 2) U.S. Pat. No. 6,131,535

SUMMARY

The present disclosure is directed to providing an animal training apparatus and system that can substantially train or correct an animal by using vibration stimulation as a main stimulation means in place of electrical stimulation.

An animal training apparatus according to one aspect of the present disclosure which is worn on an animal to deliver vibration stimulation for correcting the animal when the animal does or does not do a particular behavior, the animal training apparatus including at least two vibration motors configured to generate the vibration stimulation and deliver the vibration stimulation to the animal, and a microprocessor comprising control logic programmed to control the at least two vibration motors to deliver the vibration stimulation to the animal when a preset condition is satisfied, wherein at least one of the at least two vibration motors generates vibration stimulation with variable intensity, and the microprocessor controls the at least two vibration motors to make a sum of vibration stimulation generated by the at least two vibration motors equal a desired intensity of vibration stimulation that is determined based on the preset control logic or the satisfied condition.

In this instance, the at least two vibration motors may be each a direct current motor that is driven by pulses, and the microprocessor may change the intensity of vibration stimulation by changing a pulse width of the pulses that drive each of the vibration motors.

Alternatively, at least one of the at least two vibration motors may be a direct current motor that is driven by pulses, at least one other vibration motor of the at least two vibration motors may be a direct current motor that generates vibration stimulation of a constant intensity, and the microprocessor may control the at least two vibration motors to make the sum of vibration stimulation generated by the at least two vibration motors equal the desired intensity of vibration stimulation, by changing the pulse width of the pulses that drive the at least one vibration motor while controlling ON/OFF of the at least one other vibration motor.

The animal training apparatus may further include a sensor to detect whether the animal did or did not do the particular behavior, and the microprocessor may determine whether the preset condition is satisfied by a signal outputted from the sensor.

The animal training apparatus may further include a memory, and the microprocessor may store, in the memory, a working history including a working time and an intensity of vibration stimulation at that time, when at least one of the at least two vibration motors works.

An animal training system according to another aspect of the present disclosure includes an animal training apparatus worn on an animal to deliver stimulation to the animal and a remote controller possessed by a user to control the animal training apparatus, the remote controller and the animal training apparatus configured to communicate with each other via wireless communication, the animal training apparatus including at least two vibration motors configured to generate the vibration stimulation and deliver the vibration stimulation to the animal, a wireless communication module configured to receive a signal from the remote controller, and a microprocessor configured to control the at least two vibration motors to deliver the vibration stimulation to the animal based on the signal received by the wireless communication module, wherein at least one of the at least two vibration motors generates vibration stimulation with variable intensity, and the microprocessor controls the at least two vibration motors to make a sum of vibration stimulation generated by the at least two vibration motors equal a desired intensity of vibration stimulation that is determined based on the signal from the remote controller, and the remote controller including a user input means configured to select a particular stimulation mode from a plurality of stimulation modes differing in intensity or duration of vibration stimulation to be delivered by the animal training apparatus or a particular function from a plurality of functions provided by the animal training system, and input an execution command of the selected stimulation mode or function, a wireless communication module configured to transmit signals representing the stimulation mode or function selected by the user input means to the animal training apparatus, and a microprocessor configured to process the signals and control the wireless communication module.

In this instance, the at least two vibration motors may be each a direct current motor that is driven by pulses, and the microprocessor of the animal training apparatus may change the intensity of vibration stimulation by changing a pulse width of the pulses that drive each of the vibration motors based on the signal from the remote controller.

Alternatively, at least one of the at least two vibration motors may be a direct current motor that is driven by pulses, at least one other vibration motor of the at least two vibration motors may be a direct current motor that generates vibration stimulation of a constant intensity, and the microprocessor of the animal training apparatus may control the at least two vibration motors to make the sum of vibration stimulation generated by the at least two vibration motors equal the desired intensity of vibration stimulation, by changing the pulse width of the pulses that drive the at least one vibration motor while controlling ON/OFF of the at least one other vibration motor.

The remote controller may further include a memory, and the microprocessor of the remote controller may store, in the memory, a working history including a working time and an intensity of vibration stimulation at that time, when having commanded the animal training apparatus to work.

The user input means of the remote controller may include a dial to adjust the intensity of vibration stimulation to be delivered to the animal, and the plurality of stimulation modes may include a ramp mode in which the vibration stimulation is delivered with the intensity of vibration stimulation to be delivered to the animal increasing from 0 to an intensity set by the dial.

The plurality of stimulation modes may include a boost mode in which the vibration stimulation is delivered with the intensity of vibration stimulation to be delivered to the animal increasing from a currently set intensity by a predetermined amount.

The user input means of the remote controller may include a dial to adjust the intensity of vibration stimulation to be delivered to the animal, and the plurality of stimulation modes may include an instant mode in which the vibration stimulation is delivered to the animal with the intensity of vibration stimulation set by the dial by manipulating only the dial for a preset time.

The animal training apparatus may further include a lighting means, and the plurality of functions may include a function of lighting the lighting means by the remote controller.

The remote controller may further include a beeper, and the plurality of functions may include a function of activating the beeper when a preset time passes.

According to the present disclosure, there is provided an animal training apparatus and system that can substantially correct animal's behavior using vibration stimulation as a main stimulation means without using electrical stimulation, with the vibration stimulation varying in an adequate range using a plurality of vibration motors.

Also, according to the embodiments, various stimulation modes are provided to deliver stimulation that is necessary and appropriate for the situation to various types of animals, maximizing the effects on animal training and behavior correction.

Also, according to the embodiments, the working history of the animal training apparatus is stored in memory and allows a user to see it through an external terminal, so the user can know when and how often the corresponding animal did behaviors needed to correct, if suitable correction is being done, and if the intensity of stimulation being currently set is proper.

BRIEF DESCRIPTION OF DRAWINGS

FIG. 7 shows an enlarged diagram (a) of a display of a remote controller shown in FIG. 4 and a table (b) describing each icon on the display.

DETAILED DESCRIPTION

Hereinafter, an animal training apparatus and an animal training system according to the present disclosure is described in detail with reference to the accompanying drawings.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. The description proposed herein is just a preferable example for the purpose of illustrations only, not intended to limit the scope of the disclosure, so it should be understood that other equivalents and modifications could be made thereto at the time the present application was filed.

Figure 1:
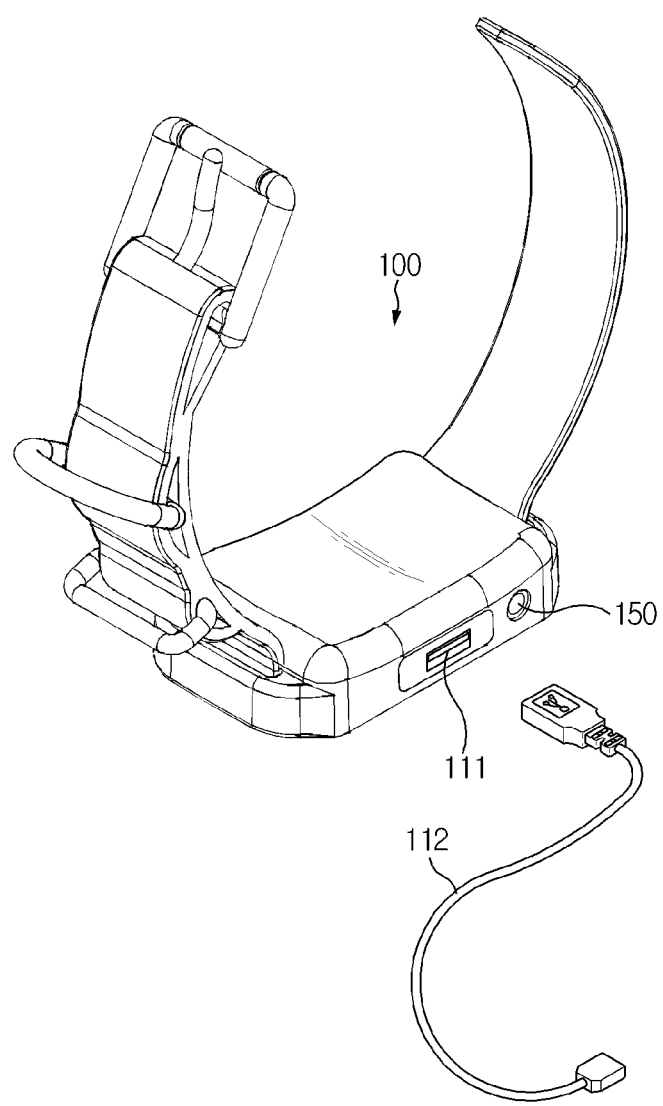
FIG. 1 is a perspective view illustrating an animal training apparatus according to an exemplary embodiment of the present disclosure.
Figure 2:
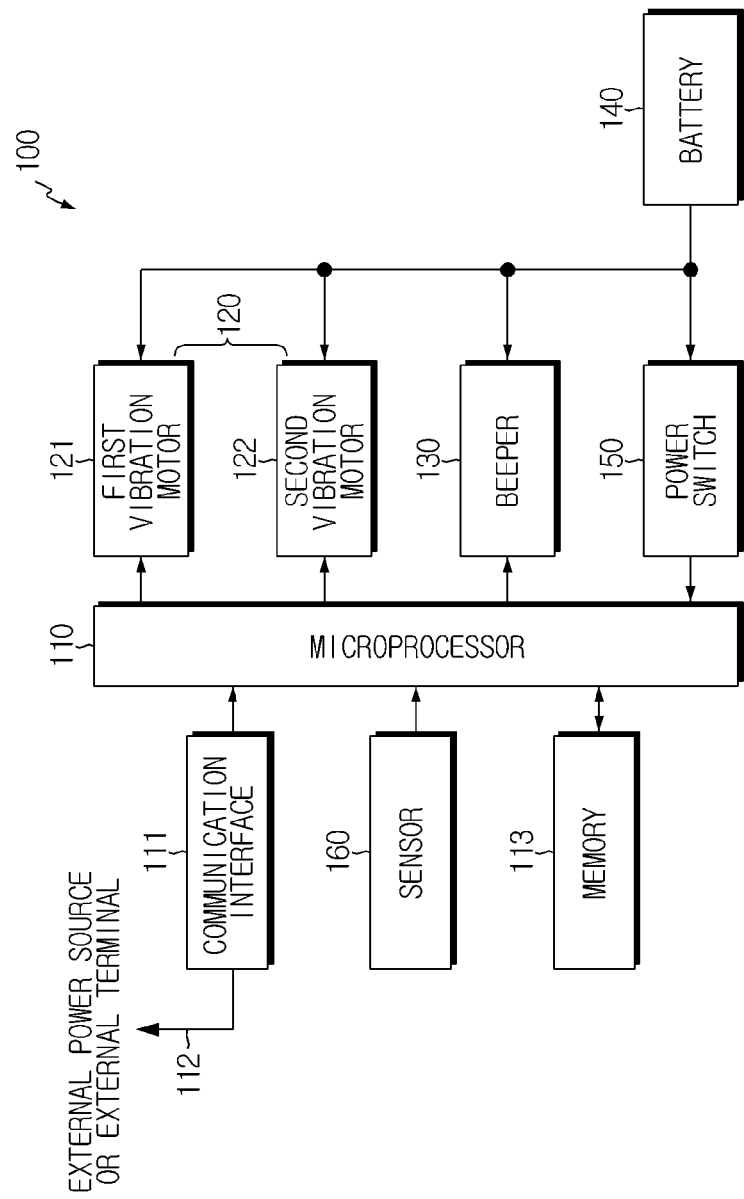
FIG. 2 is a block diagram illustrating the components of the animal training apparatus shown in FIG. 1.

FIG. 1 is a perspective view illustrating an animal training apparatus according to an exemplary embodiment of the present disclosure, and FIG. 2 is a block diagram of the animal training apparatus.

The animal training apparatus 100 of this embodiment shown in FIGS. 1 and 2 is an electronic animal training apparatus used to train an animal (typically, a dog, but the present disclosure is not limited thereto) or correct the animal's behavior, and is worn on the body (typically, the neck) of the animal. The animal training apparatus 100 of this embodiment has elements such as, for example, a stimulation means including a plurality of vibration motors, a microprocessor, a battery, and a necessary sensor.

In this embodiment, the stimulation means is a main stimulation means used to train the animal and correct the animal's behavior, and includes a plurality of vibration motors 120 to deliver vibration stimulation, and a beeper 130 to generate a sound as a relatively weak stimulation with an aim of getting the animal's attention or for detecting the location of the animal training apparatus 100.

The vibration motors 120 embedded in the animal training apparatus 100 may be a typical vibration motor in which an eccentric pendulum is suspended at the axis of rotation, and as the eccentric pendulum rotates, oscillation occurs at the center of gravity to vibrate the entire animal training apparatus 100. However, in this embodiment, the vibration motors 120 include at least two vibration motors of which the intensity of vibration stimulation is variable, namely, the intensity of vibration stimulation can change from the level of vibration stimulation that gets the animal's attention or encourages the animal to the level of vibration stimulation the animal dislikes enough to stop the animal from doing an undesirable behavior.

Methods of changing the intensity of vibration stimulation are different depending on the specification of the vibration motor, but for example, in the case of a direct current (DC) motor that is pulse driven, the intensity of vibration stimulation may be changed by adjusting the amplitude, frequency, pulse width, interval, pulse ratio, duty cycle, repetition ratio and duration of the driving pulses. In this embodiment, a DC motor that is driven by pulses is used as the vibration motor 120, and the intensity of vibration stimulation is changed by changing the pulse width of the driving pulses. Also, further to vibration stimulation, optionally, the intensity of vibration stimulation may be changed by changing the duration.

Figure 3:
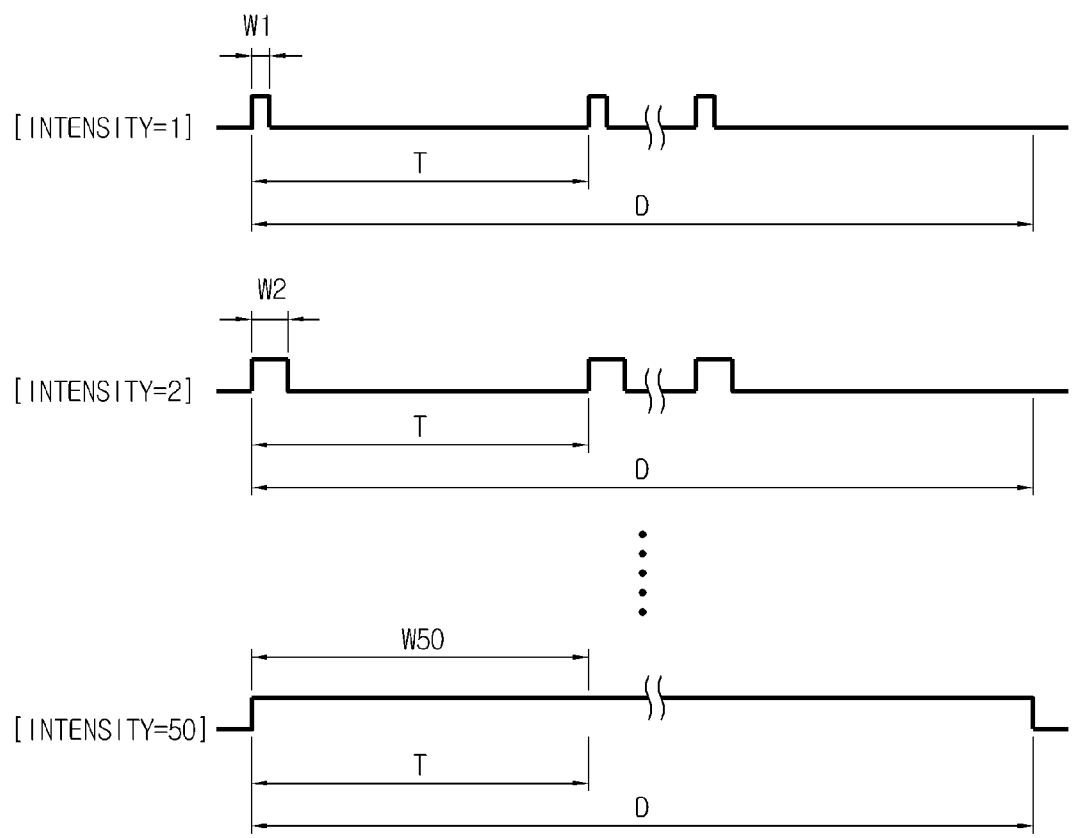
FIG. 3 is a waveform diagram of pulses that drive vibration motors of the animal training apparatus shown in FIG. 1.

Specifically, referring to FIG. 3 showing a waveform diagram of driving pulses of the vibration motors 120, when it is assumed that the period (T) and the duration (D) of the driving pulses is constant, the intensity of vibration stimulation is changed by the microprocessor 110 which applies the driving pulses having the pulse width (W1, W2, . . . , W50) in proportion to the stimulation intensity to the vibration motors 120. Here, when changes are made to the length of time vibration stimulation lasts in parallel with changes in intensity per unit period (T) by changing the duration (D) of the driving pulses, for example, between a few periods (T) and thousands of periods (T), as a result, the intensity of vibration stimulation may be changed.

On the other hand, in this embodiment, the vibration motors include two vibration motors, a first vibration motor 121 and a second vibration motor 122. This is for making the sum of intensity of vibration stimulation generated by a plurality of vibration motors using the plurality of vibration motors equal a desired intensity of vibration stimulation when the maximum intensity of vibration stimulation attainable by one vibration motor does not reach a sufficient intensity for correcting the animal's behavior. Accordingly, unless a desired intensity is fully attained by two vibration motors, a desired intensity may be attained by increasing the number of vibration motors to three or four.

When two vibration motors 120 are used as in this embodiment, the intensity of vibration stimulation generated by the two vibration motors 120 may equal a desired intensity by adjusting the pulse width of driving pulses of each vibration motor in the case where the two vibration motors 120 are the same type and standard. For example, when a desired intensity is level 52 that is higher than the maximum intensity attainable by one vibration motor, or level 50, the pulse width of the driving pulses of the first and second vibration motors 120 is each set to the pulse width (W26) corresponding to level 26. Alternatively, the pulse width of the driving pulses of the first vibration motor 121 may be set to the maximum pulse width (W50), and the pulse width of the driving pulses of the second vibration motor 122 may be set to the pulse width (W2) corresponding to the intensity=2. That is, when a desired intensity does not exceed the maximum intensity attainable by one vibration motor, or level 50, only the first vibration motor 121 is driven, and when a desired intensity does not exceed level 50, the first vibration motor 121 is driven at the maximum pulse width (W50) and the second vibration motor 122 is driven at the pulse width corresponding to the intensity higher than level 50.

Further, the type and the standard of the two vibration motors may be not identical. That is, the first vibration motor 121 may be a pulse driven DC motor having intensity adjustable by pulse width modulation, and the second vibration motor 122 may be a DC motor that generates vibration stimulation having a predetermined fixed intensity (the intensity is fixed at the maximum intensity). In this case, when a desired intensity does not exceed the maximum intensity attainable by one vibration motor, or level 50, the first vibration motor 121 is driven while the second vibration motor 122 is in OFF state, and when a desired intensity exceeds level 50, vibration of the maximum intensity (level 50) is accomplished by placing the second vibration motor 122 in ON state, and the first vibration motor 121 is driven at the pulse width corresponding to the intensity higher than level 50.

The beeper 130 for generating a sound as an auxiliary stimulation means is implemented as a buzzer, a piezoelectric device or a speaker to generate a sound of frequency audible to animals or humans. In this case, the beeper 130 may be one of simple specification with invariable intensity or frequency of sound, but sound stimulation delivered to the animal may be variously adjusted by adjusting the intensity (amplitude), frequency, pulse width, interval, pulse ratio, duty cycle, repetition ratio, and duration of the sound pulses through the microprocessor 110 based on the specification of the beeper 130.

Besides, light from a light-emitting diode (LED) lamp may be used as a stimulation means or for detecting the location of the animal training apparatus 100.

A battery 140 supplies required power to each component of the animal training apparatus 100, especially the microprocessor 110 and the stimulation means 120 and 130, and preferably includes a rechargeable secondary battery.

A power switch 150 is a power switch which switches ON/OFF the animal training apparatus 100. Also, although not shown, the animal training apparatus 100 may be equipped with a regulator (not shown) connected to the power switch 150 to uniformly maintain the voltage of power source from the battery 140.

Although not shown in the drawing, the animal training apparatus 100 may be also equipped with a display to display a remaining amount of the battery 140 or the type or mode of the stimulator means currently in operation.

A sensor 160 detects the animal's behavior such as barking and a motion, and may include various types of sensors based on a specific behavior intended to detect.

For example, when the animal training apparatus 100 of the present disclosure is used as an animal behavior correcting apparatus which detects an animal barking, and to train the animal not to bark, delivers stimulation to the animal, the sensor 160 may be a piezoelectric sensor which detects vocal cords of the animal vibrating or a microphone which detects the animal barking.

Also, when the animal training apparatus 100 of the present disclosure is used as an animal behavior correcting apparatus which detects an animal going out of a preset area or approaching the area, and to train the animal not to do so, delivers stimulation to the animal, the sensor 160 may be a sensor that senses a signal (electromagnetic wave, ultrasonic wave, and infrared light) from a transmitter (a wire buried in the ground or a radio-frequency, ultrasonic or infrared transmitter installed at a point) installed at the area or its boundary, or an image sensor that senses a particular mark installed at the area or its boundary.

Further, the sensor 160 may be a gyro sensor or an acceleration sensor that detects a motion of an animal. In this case, when the motion detection sensor 160 does not output a signal for a predetermined time or longer, in other words, when the animal does not move for a predetermined time or longer, the microprocessor 110 may control the animal training apparatus 100 to shift to a sleeping mode, or on the contrary, when a motion or barking of the animal is detected, the microprocessor 110 may control the animal training apparatus 100 to wake up from the sleeping mode.

The microprocessor 110 controls the operation of the animal training apparatus 100 including the stimulation means 120 and 130. The microprocessor 110 is typically implemented as an integrated circuit (IC) chip, and may have a necessary memory 113 or register, and the operation of the microprocessor 110 may be implemented as control logic programmed in software, firmware, and a hardwired logic.

The microprocessor 110 receives an input of the signal from the sensor 160, and when a preset condition is satisfied, that is, for example, the intensity of the signal from the sensor 160 exceeds a preset reference value, the microprocessor 110 controls the stimulation means 120 and 130, especially the vibration motor 120, to deliver vibration stimulation to the animal. In this instance, when the intensity of the signal from the sensor 160 exceeds the preset reference value, the microprocessor 110 may control the vibration motor 120 to deliver stimulation with a preset intensity and/or duration of vibration stimulation, or may be programmed to deliver stimulation with varying intensities and/or durations of vibration stimulation based on the intensity of the signal from the sensor 160.

The memory 113 stores programs for defining the operation of the microprocessor 110 or data such as the set conditions. Also, each time the animal training apparatus 100, in particular, the vibration motors 120 work, the memory 113 may store a working history including the working time and the intensity of vibration stimulation at that time. When the user sees the stored working history through an external terminal such as a computer terminal or a smart phone, the user can know when and how often the corresponding animal did behaviors needed to correct, if suitable correction is being done, and if the intensity of stimulation being currently set is proper.

To do so, the animal training apparatus 100 has a communication interface to electrically connect the microprocessor 110 to the external terminal. Although the communication interface is implemented by a wired communication method, including a universal serial bus (USB) port 111 and a USB communication cable 112 in the examples shown in FIGS. 1 and 2, the communication interface may be implemented by a wireless communication method such as, for example, Bluetooth. Also, the USB port 111 and the USB communication cable 112 may be used to charge the battery 140.

Further, the user may set or change at least a part of control logic of the microprocessor 110 by using the communication interface and an appropriate application. That is, the user may set or change the reference value of the sensor 160 output for determining whether the above described preset condition is satisfied and its corresponding stimulation mode, may set or change automatic ON/OFF of the animal training apparatus 100, or set or change a timer for sleeping/wakeup, and may set or change ON/OFF of the above described beeper 130 or lighting means for detecting the location of the animal training apparatus 100, for example, at night, when the animal training apparatus 100 has the above described beeper 130 or lighting means such as an LED lamp.

According to the animal training apparatus of this embodiment, it is possible to substantially correct animal's behavior by using vibration stimulation with variable stimulation intensity as a main stimulation means.

Although the embodiments described hereinabove show that the present disclosure only consists of an animal training apparatus, the present disclosure may be applied to an animal training system including a remote controller possessed by a user and an animal training apparatus worn on an animal. Hereinafter, an animal training system according to another embodiment of the present disclosure is described.

Figure 4:
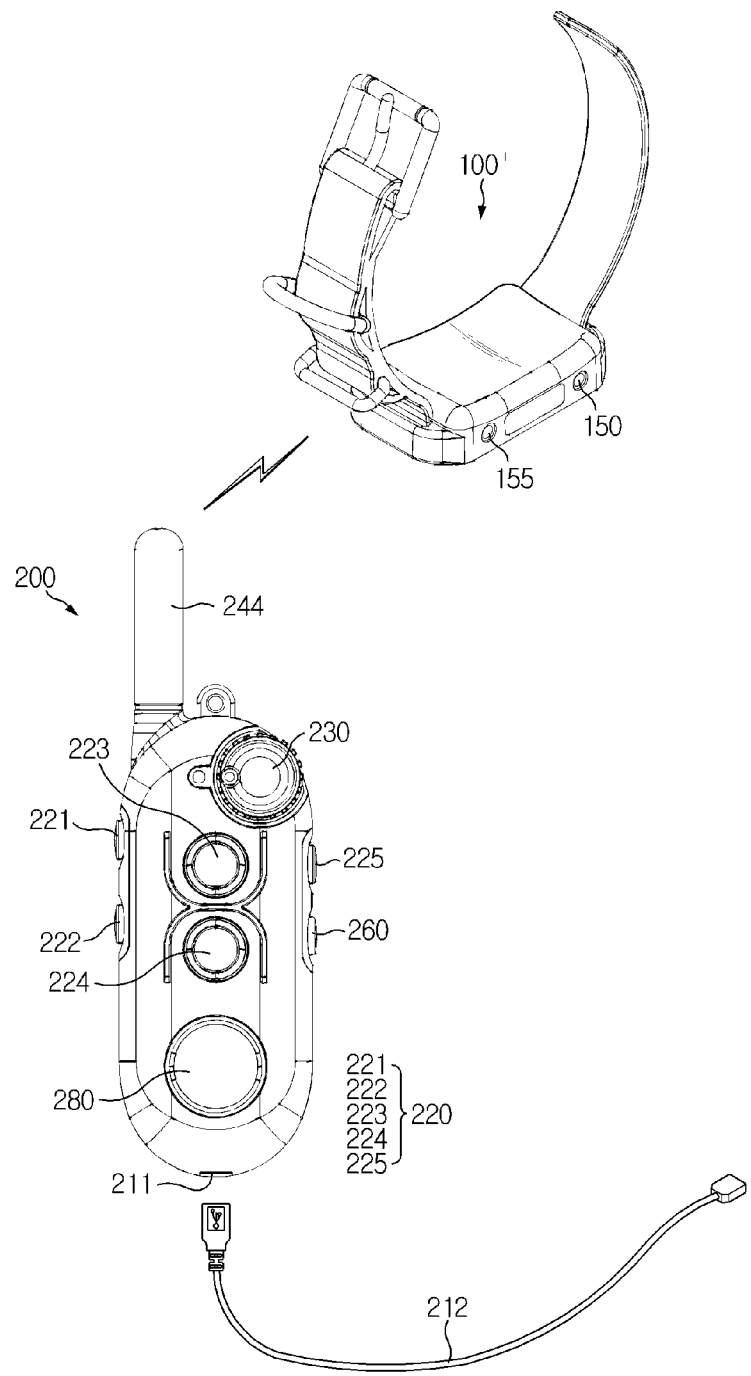
FIG. 4 is a perspective view illustrating an animal training system according to another exemplary embodiment of the present disclosure.
Figure 5:
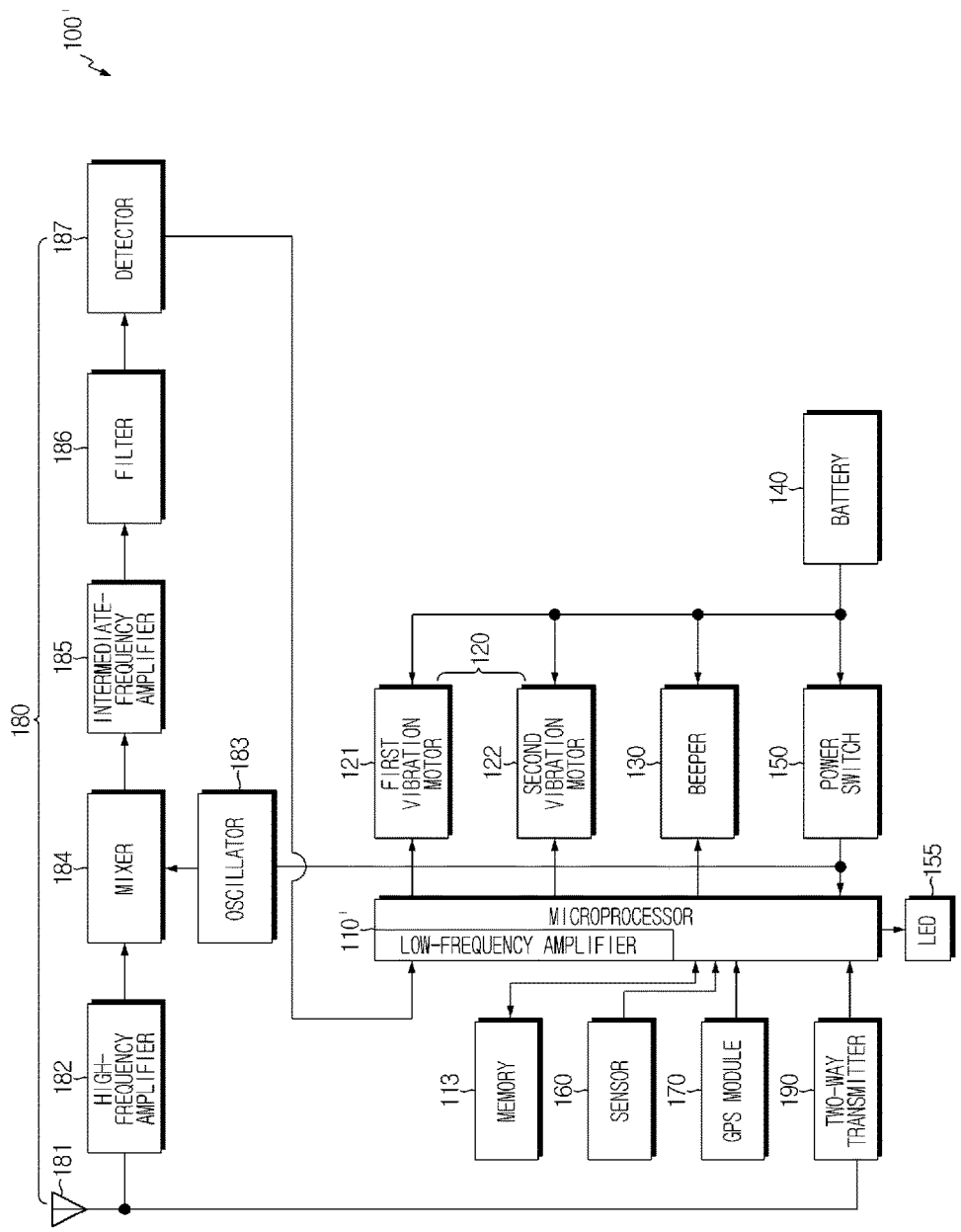
FIG. 5 is a block diagram illustrating the components of an animal training apparatus shown in FIG. 4.
Figure 6:
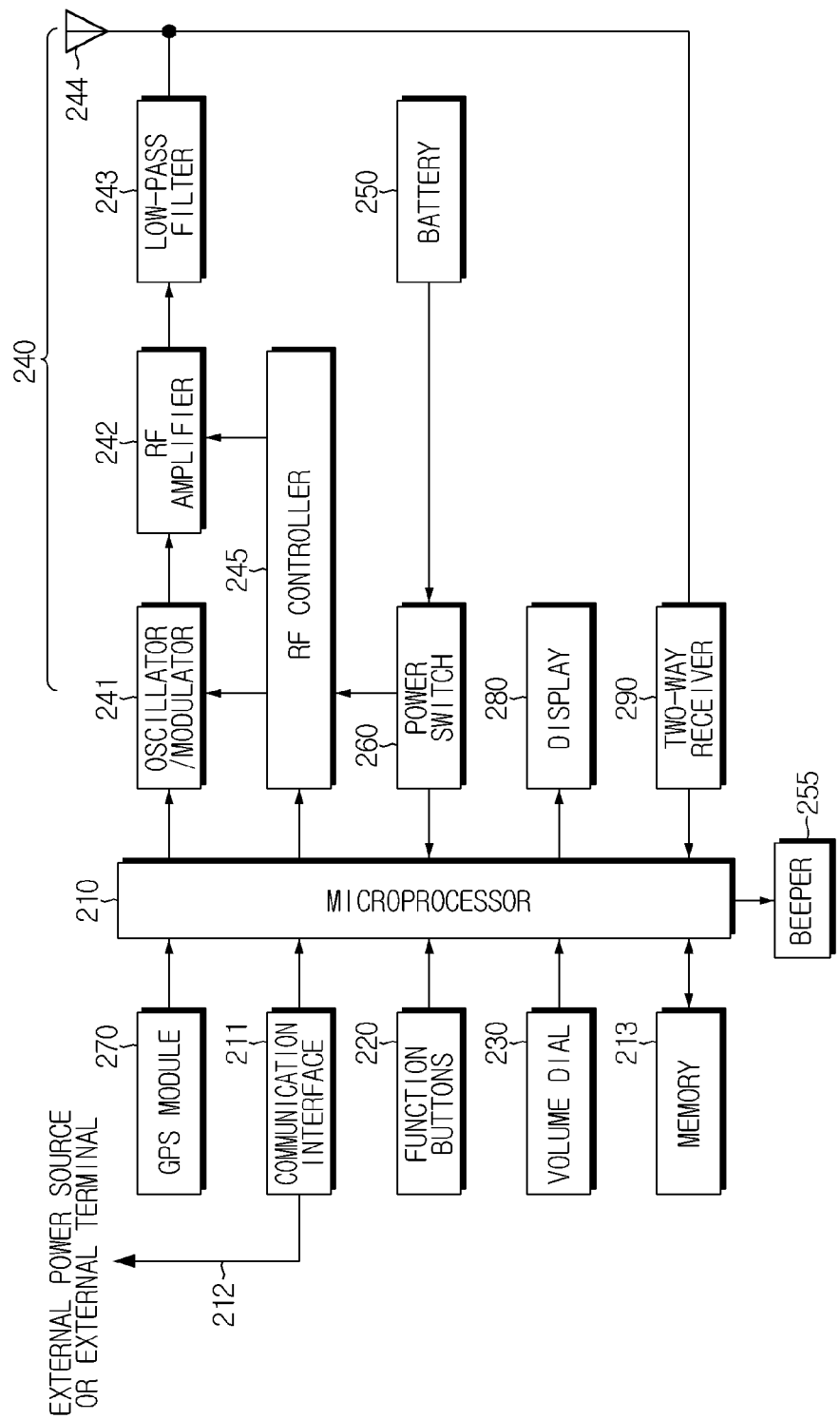
FIG. 6 is a block diagram illustrating the components of a remote controller shown in FIG. 4.

FIG. 4 is a perspective view illustrating an animal training system according to another exemplary embodiment of the present disclosure, and FIGS. 5 and 6 are block diagrams each illustrating the components of an animal training apparatus 100' and a remote controller 200 shown in FIG. 4.

Referring to FIG. 4, the animal training apparatus of this embodiment includes a training apparatus 100' worn on an animal to deliver stimulation for correcting the animal's behavior when the animal does a behavior needed to correct, and a remote controller 200 possessed by a user to control the animal training apparatus 100', and the remote controller 200 and the animal training apparatus 100' are configured to communicate with each other via wireless communication.

The animal training apparatus 100' of this embodiment has a basic structure nearly similar to the animal training apparatus 100 of the previous embodiment. A core difference is that the animal training apparatus 100' of this embodiment has a wireless communication module 180 for wireless communications with the remote controller 200, and because the user does not need to directly set/change the functions of the animal training apparatus 100', the animal training apparatus 100' does not need to have a communication interface (111 and 112 in the previous embodiment) (However, a USB port may be provided as a terminal for charging the battery 140). Also, a microprocessor 110' is slightly different in specific configuration from the microprocessor 110 of the animal training apparatus 100 described above. Hereinafter, the animal training apparatus 100' of this embodiment is described with an emphasis on the difference from the animal training apparatus 100 described above.

The wireless communication module 180 added to the animal training apparatus 100' of this embodiment includes an antenna 181, a radio-frequency amplifier 182, an oscillator 183, a mixer 184, an intermediate-frequency amplifier 185, a filter 186, and a detector 187 as shown in FIG. 5. The antenna 181 receives RF signals transmitted from the remote controller 200, and the radio-frequency amplifier 182 amplifies weak RF signals induced into the antenna 181. The oscillator 183 is a self-oscillator for obtaining second intermediate frequency, and signals generated by the oscillator 183 are combined with the RF signals from the radio-frequency amplifier 182 by the mixer 184 into second intermediate frequency signals. The intermediate-frequency amplifier 185 amplifies the intermediate frequency signals produced from the mixer 184, and the filter 186 filters out noise from the intermediate frequency signals produced from the mixer 184. The detector 187 detects operation signals and control signals such as ID codes sent from the remote controller 200, and the detected control signal is inputted to the microprocessor 110' through a low-frequency amplifier.

Although not essential, the animal training apparatus 100' of this embodiment may have a global positioning system (GPS) module 170 or a two-way transmitter 190. The GPS module 170 receives signals from a satellite, and inputs location information of the animal to the microprocessor 110'. The two-way transmitter 190 transmits the location information of the animal or information associated with the animal training apparatus 100' such as remaining amount information of the battery 140 to the remote controller 200 through the antenna 181.

The microprocessor 110' receives an input of the control signal from the remote controller 200 through the wireless communication module 180, and controls the operation of the stimulation means 120 and 130. That is, in this embodiment, the microprocessor 110' passively operates under the control of the remote controller 200 as opposed to the microprocessor 110 of the previous embodiment.

Although not essential, the animal training apparatus 100' may have the sensor 160 in the same way as the previous embodiment. In this case, the microprocessor 110' may actively operate to deliver stimulation to the animal based on the signal from the sensor 160, similar to the microprocessor 110 of the previous embodiment. However, transition to an active operation mode itself is made by the user under the control of the remote controller 200.

Also, although not essential, the animal training apparatus 100' may have a lighting means 155 such as a LED lamp. The lighting means 155 can be used as a stimulation means used for the animal, but is a means that is turned on at night to implement a function of allowing for easy detection of the location of the animal (the animal training apparatus). The activation/deactivation of a lighting function (detecting the location of the animal training apparatus) and setting/change of lighting hour of the lighting means 155 is made by the user under the control of the remote controller 200.

The remote controller 200 of this embodiment is a transmitter possessed by a user in a general animal training system. Thus, the remote controller 200 has elements of a general remote controller for setting/selecting a stimulation mode or executing various functions, for example, a button or a switch, a microprocessor, a battery, and a display.

That is, referring to FIGS. 4 and 6, the remote controller 200 has a user input means to select a mode of stimulation to be delivered by the animal training apparatus 100' or select functions provided by the animal training system and input an execution command, a wireless communication module 240 to transmit signals representing the stimulation mode or function selected by the user input means to the animal training apparatus, a microprocessor 210 to process the signals and control the wireless communication module 240, a battery 250, and a power switch 260.

The user input means includes a plurality of buttons 220 or switches and a dial 230 to set the type, intensity, and duration (the length of time stimulation lasts) of stimulation to be delivered to the animal through the animal training apparatus 100'. The dial 230 is a switch which adjusts the intensity of stimulation currently selected stimulation (vibration stimulation), and the function buttons 220 are used to select the type of stimulation and input an execution command, initialize or register the remote controller 200 or the animal training apparatus 100', or change the settings, and a detailed description is provided together with the stimulation mode.

The wireless communication module 240 includes an oscillator/modulator 241, a radio frequency (RF) amplifier 242, a low-pass filter 243, an antenna 244, and a RF controller 245. The oscillator/modulator 241 modulates signals inputted from the microprocessor 210 that will be transmitted by a wireless communication method, and the RF amplifier 242 amplifies RF signals from the oscillator/modulator 151. The low-pass filter 243 blocks harmonics other than the fundamental waves in the amplified RF signals, and the antenna 244 transmits the RF signals composed of the fundamental waves having passed through the low-pass filter 243. Also, the RF controller 245 supplies power to operate the oscillator/modulator 241 and the RF amplifier 242 when a control signal needs to be transmitted to the animal training apparatus 100' in response to an input from the user through the user input means of the remote controller 200.

The battery 250 supplies required power to each component of the remote controller 200, especially the microprocessor 210 and the wireless communication module 240, and preferably includes a rechargeable secondary battery.

The power switch 260 is a switch which switches ON/OFF the remote controller 200. Also, similar to the animal training apparatuses 100 and 100' described above, the remote controller 200 may be equipped with a regulator (not shown) which is connected to the power switch to constantly maintain the voltage of power supplied from the battery 250.

The remote controller 200 of this embodiment may be further equipped with a display 280. The display 280 displays the type, intensity, and duration of stimulation selected/set by the user input means or the settings of the remote controller 200 or the animal training apparatus 100', and further, the remaining amount of the battery 250 of the remote controller 200.

Although not essential, the remote controller 200 of this embodiment may have a GPS module 270 or a two-way receiver 290. The GPS module 270 receives signals from a satellite and displays location information of the user or the remote controller on the display 280. Also, as described above, when the animal training apparatus 100' has the GPS module 170 and the two-way transmitter 190 and transmits current location information of the animal or remaining amount information of the battery 140 of the animal training apparatus 100' to the remote controller 200, a distance from the user to the animal and its direction, a movement speed of the animal, and remaining amount information of the battery 140 of the animal training apparatus 100' may be displayed on the display 280.

The remote controller 200 of this embodiment may further include a beeper 255 or a lighting means (not shown)

such as a LED lamp. The beeper 255 or lighting means may be used for the user to detect the location of the remote controller 200.

The microprocessor 210 controls the entire operation of the animal training system including the animal training apparatus 100' and the remote controller 200. The microprocessor 210 is typically implemented as an IC chip, and may have a necessary memory 213 or register, and the operation of the microprocessor 210 may be implemented as control logic programmed in software, firmware, and a hardwired logic.

Figure 8:
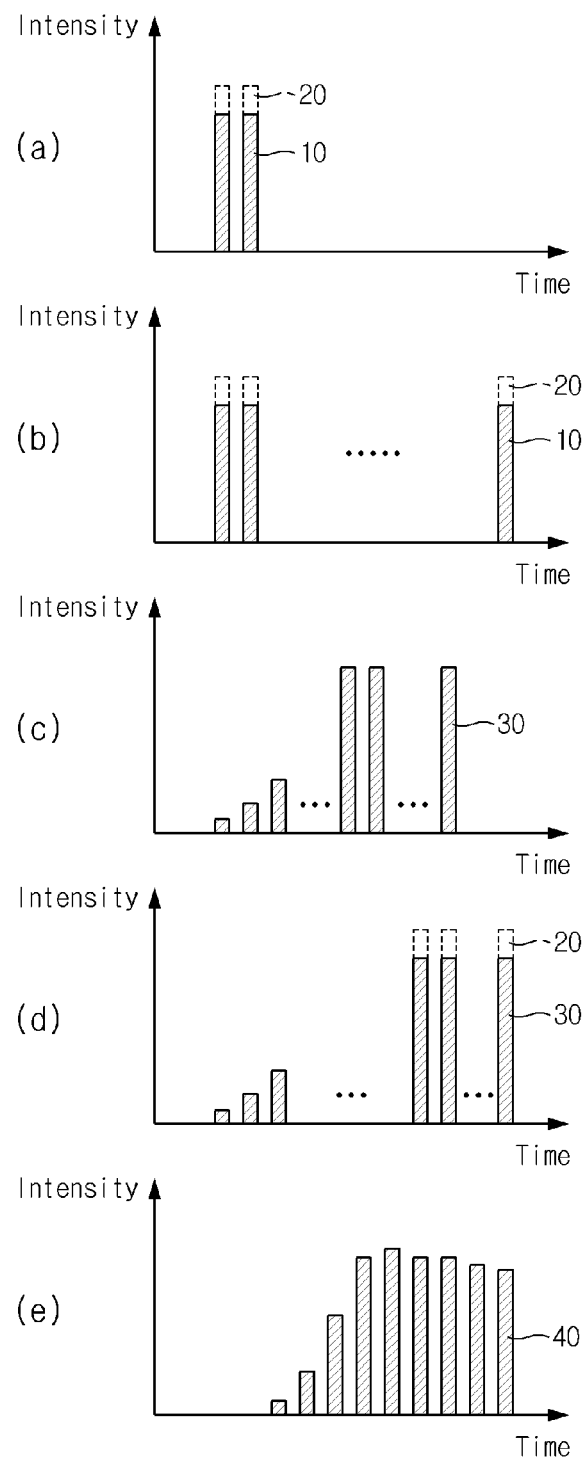
FIG. 8 is a diagram illustrating the intensity of vibration stimulation delivered to an animal for each stimulation mode in the animal training system shown in FIG. 4.

Hereinafter, the specific operation of the microprocessor 210 is described by referring to FIGS. 7 and 8 together with of the user input means, the display 280, and the stimulation mode.

First, as shown in (a) of FIG. 7, the display 280 displays the settings of the remote controller 200 or the animal training apparatus 100' and the stimulation mode in the form of icons 281~288 or a text using a LCD or LED. That is, when a corresponding mode or function is selected, or based on a current condition, each icon 281~288 is selectively lighted up. The stimulation mode or function represented by each icon 281~288 on the display 280 is described in the table as shown in (b) of FIG. 7, and a detailed description is as follows.

The icons 281 of English alphabet and symbol '+' arranged at the upper part of the display 280 represent each mode of stimulation (especially, vibration stimulation) delivered by the animal training apparatus 100'.

Specifically, among the icons 281, 'M' is lighted up to indicate a mode (Momentary Stimulation Mode, hereinafter simply referred to as 'M Mode') in which vibration stimulation of a level (intensity) currently set by the dial 230 is momentarily delivered (in the form of a single cycle of pulses or a few cycles of pulses) through the vibration motor 120 of the animal training apparatus 100'. Here, vibration stimulation of the set intensity is accomplished by changing the pulse width of pulses that drive the vibration motors 120 as described with reference to FIG. 3. Each time the function button (any one of 221~225) assigned to the stimulation mode is pressed, the stimulation mode runs for a preset short time (e.g., 1~3 seconds) irrespective of the period of time during which the button is pressed (see Reference Numeral 10 in (a) of FIG. 8).

Among the icons 281, 'C' is lighted up to indicate a mode (Continuous Stimulation Mode, hereinafter briefly referred to as 'C Mode') in which vibration stimulation of a level (intensity) currently set by the dial 230 is delivered while the corresponding button (any one of 221~225) is being pressed through the vibration motors 120 of the animal training apparatus 100' (see Reference Numeral 10 in (b) of FIG. 8).

Among the icons 281, 'R' is lighted up to indicate a mode (Ramp Mode, hereinafter briefly referred to as 'R Mode') in which vibration stimulation automatically increasing from level 0 to a level (intensity) currently set by the dial 230 for a preset time (e.g., 1 second) and subsequently fixed to the level is delivered while the corresponding button (any one of 221~225) is being pressed through the vibration motors 120 of the animal training apparatus 100' (see Reference Numeral 30 in (c) of FIG. 8).

Among the icons 281, a '+' icon are lighted up together with 'M', 'C', and 'R' (such as 'M+', 'C+', 'R+') to indicate a mode (Boost Mode, hereinafter respectively referred to as 'M+Mode', 'C+Mode', and 'R+Mode') in which vibration stimulation delivered through the vibration motors 120 of the animal training apparatus 100' in each stimulation mode (M, C, and R modes) is delivered at a level higher by a preset level than a level (intensity) currently set by the dial 230 (see Reference Numeral 20 in (a), (b), and (d) of FIG. 8).

Among the icons 281, 'I' is lighted up to indicate a mode (Instant Mode, hereinafter referred to as 'I Mode') in which vibration stimulation changing from level 0 to a level (intensity) currently set by the dial 230 is delivered only by the dial 230 without continuously pressing the corresponding button 221~225 through the vibration motors 120 of the animal training apparatus 100' (see Reference Numeral 40 in (e) of FIG. 8). Entry into this stimulation mode is accomplished by adjusting the dial 230 to set a stimulation level to 0 and short-pressing the corresponding button (any one of 221~225), and afterwards, the stimulation mode continues by the adjustment of the dial 230 and ends when the dial 230 is reduced to 0 or after a preset time (e.g., 30 seconds) passes. This mode is useful in adjusting the dial 230 based on a response of the animal to find a stimulation level suitable for the corresponding animal, and in particular, it is convenient in a situation where the user has difficulty in using both hands.

Among the icons 281, 'T' is lighted up to indicate a mode (Tone Mode, hereinafter referred to as a 'T Mode') in which sound stimulation is delivered while the corresponding button (any one of 221~225) is being pressed through the beeper 130 of the animal training apparatus 100'.

Generally, sound stimulation is less stimulative to the animal than other stimulation, and in some instance, may be stimulation pleasant for the animal. Thus, sound stimulation may be used at a step before a step of delivering a main stimulation means or vibration stimulation, or may be used to encourage or compliment the animal or get the animal's attention, based on a behavior level of the animal.

In the above mentioned stimulation modes, particularly C, R, I, and T modes, stimulation is continuously delivered to the animal while the corresponding button is pressed or the dial 230 is adjusted, and as a result, in some instances, excessive stimulation may be delivered. To prevent this, a maximum value of stimulation duration (e.g., 10~30 seconds) may be set irrespective of a period of time during which the button or dial is pressed or adjusted, and the maximum value may be changed.

Two 7-segment icons 282 at the center of the display 280 indicate the intensity (level) of stimulation (especially, vibration stimulation) currently set or delivered immediately before, and in this embodiment, vibration stimulation is divided into 100 total levels from 1 to 100 and fine control may be taken based on the sensitivity of the animal to stimulation.

A number icon 283 disposed between the alphabet icon 281 and the 7-segment icon 282 indicates the animal training apparatus 100' (i.e., animal) selected currently or immediately before when a plurality of animal training apparatuses 100' may be simultaneously controlled with one remote controller 200 (i.e., a plurality of animals may be simultaneously trained with one remote controller 200).

A '+' icon 284 disposed at the left part of the display 280 is lighted up when an amount of increase in level in the above mentioned Boost Mode (M+, C+, and R+modes) is set or changed.

An animal training apparatus shaped icon 285 disposed at the lower right side of the '+' icon 284 is lighted up when a function of detecting the location of the animal by lighting the lighting means 155 of the animal training apparatus 100' especially at night is performed.

A dumbbell shaped icon 286 disposed at the right part of the display 280 is lighted up when pairing and synchronization of the animal training apparatus 100' and the remote controller 200 is performed.

A remote controller shaped icon 287 disposed at the lower left side of the dumbbell shaped icon 286 is lighted up when a function of automatically operating the beeper 255 of the remote controller 200 when a preset time passes to let the user know the location of the remote controller 200 is performed.

Lastly, an icon 288 disposed below the display 280 is an icon indicating a remaining amount of the battery 250 of the remote controller 200.

The shape or arrangement, and further, the type of each of the icons 281~288 on the display 280 is provided for illustration only and may be changed or added (for example, displaying the location of the animal training apparatus 100' or the remote controller 200 acquired by the GPS modules 170 and 270). Also, the stimulation modes or functions indicated by each of the icons may be changed according to particular embodiments.

On the other hand, the memory 213 stores programs for defining the operation of the microprocessor 210 or data such as the set conditions. Also, each time the animal training apparatus 100', in particular, the vibration motors 120 are commanded to work through the remote controller 200, the memory 213 may store a working history including the working time and the intensity of vibration stimulation at that time. When the user sees the stored working history through an external terminal such as a computer terminal or a smart phone, the user can know when and how often the corresponding animal did behaviors needed to correct, if suitable correction is being done, and if the intensity of stimulation being currently set is proper.

To do so, the remote controller 200 has a communication interface to electrically connect the microprocessor 210 to the external terminal. Although the communication interface is embodied as a wired communication interface including a USB port 211 and a USB communication cable 212 in the examples shown in FIGS. 4 and 6, the communication interface may be implemented by a wireless communication method such as, for example, Bluetooth. Also, the USB port 211 and the USB communication cable 212 may be used to charge the battery 250.

Further, using the communication interface and an appropriate application or the user input means 220 and 230, the user may change the functions allotted to each function button 221~225, set or change activation/deactivation of a particular function or condition, or set or change at least a part of control logic of the microprocessor 210. That is, the user may execute the application on the external terminal connected with the communication interface or press a particular button (e.g., 225) of the remote controller 200 for a long time (e.g., for one or more seconds) to enter a programming mode of the animal training system, and set/change the button assignment, set/change the above described stimulation modes, and set/change and activate/deactivate the above described functions by using the particular button 220 or the dial 230 while seeing the display 280.

Hereinabove, the animal training apparatus and the animal training system according to the present disclosure has been described. While the present disclosure has been described by particular embodiments, various modifications and changes may be made thereto by person having ordinary skill in the technical field to which the present disclosure belongs without departing from the technical aspects of the present disclosure. Therefore, the present disclosure shall not be limited to the scope narrower than the scope of the appended claims.

What is claimed is:

1. An animal training apparatus which is worn on an animal to deliver vibration stimulation for correcting the animal when the animal does or does not do a particular behavior, the animal training apparatus comprising:
   at least two vibration motors configured to generate the vibration stimulation and deliver the vibration stimulation to the animal; and
   a microprocessor comprising control logic programmed to control the at least two vibration motors to deliver the vibration stimulation to the animal when a preset condition is satisfied,
   wherein at least one of the at least two vibration motors generates vibration stimulation with variable intensity, and
   the microprocessor controls the at least two vibration motors to make a sum of vibration stimulation generated by the at least two vibration motors equal a desired intensity of vibration stimulation that is determined based on the preset control logic or the satisfied condition,
   wherein at least one of the at least two vibration motors is a direct current motor that is driven by pulses,
   at least one other vibration motor of the at least two vibration motors is a direct current motor that generates vibration stimulation of a constant intensity, and
   the microprocessor controls the at least two vibration motors to make the sum of vibration stimulation generated by the at least two vibration motors equal the desired intensity of vibration stimulation, by changing the pulse width of the pulses that drive the at least one vibration motor while controlling ON/OFF of the at least one other vibration motor.

2. The animal training apparatus according to claim 1, further comprising:
   a sensor to detect whether the animal did or did not do the particular behavior,
   wherein the microprocessor determines whether the preset condition is satisfied by a signal outputted from the sensor.

3. The animal training apparatus according to claim 1, further comprising:
   a memory,
   wherein the microprocessor stores, in the memory, a working history including a working time and an intensity of vibration stimulation at that time, when at least one of the at least two vibration motors works.

4. An animal training system comprising an animal training apparatus worn on an animal to deliver stimulation to the animal and a remote controller possessed by a user to control the animal training apparatus, the remote controller and the animal training apparatus configured to communicate with each other via wireless communication,
   the animal training apparatus comprising:
   at least two vibration motors configured to generate vibration stimulation and deliver the vibration stimulation to the animal;
   a wireless communication module configured to receive a signal from the remote controller; and
   a microprocessor configured to control the at least two vibration motors to deliver the vibration stimulation to the animal based on the signal received by the wireless communication module, wherein at least one of the at least two vibration motors generates vibration stimulation with variable intensity, and the microprocessor controls the at least two vibration motors to make a sum of vibration stimulation generated by the at least two vibration motors equal a desired intensity of vibration stimulation that is determined based on the signal from the remote controller, the remote controller comprising:
a user input device configured to select a particular stimulation mode from a plurality of stimulation modes differing in intensity or duration of vibration stimulation to be delivered by the animal training apparatus or a particular function from a plurality of functions provided by the animal training system, and input an execution command of the selected stimulation mode or function;
a wireless communication module configured to transmit signals representing the stimulation mode or function selected by the user input device to the animal training apparatus; and
a microprocessor configured to process the signals and control the wireless communication module,
wherein at least one of the at least two vibration motors is a direct current motor that is driven by pulses,
at least one other vibration motor of the at least two vibration motors is a direct current motor that generates vibration stimulation of a constant intensity, and
the microprocessor of the animal training apparatus controls the at least two vibration motors to make the sum of vibration stimulation generated by the at least two vibration motors equal the desired intensity of vibration stimulation, by changing the pulse width of the pulses that drive the at least one vibration motor while controlling ON/OFF of the at least one other vibration motor.

5. The animal training system according to claim 4, wherein the remote controller further comprises a memory, and the microprocessor of the remote controller stores, in the memory, a working history including a working time and an intensity of vibration stimulation at that time, when having commanded the animal training apparatus to work.

6. The animal training system according to claim 4, wherein the user input device of the remote controller comprises a dial to adjust the intensity of vibration stimulation to be delivered to the animal, and
the plurality of stimulation modes include a ramp mode in which the vibration stimulation is delivered with the intensity of vibration stimulation to be delivered to the animal increasing from 0 to an intensity set by the dial.

7. The animal training system according to claim 4, wherein the plurality of stimulation modes includes a boost mode in which the vibration stimulation is delivered with the intensity of vibration stimulation to be delivered to the animal increasing from a currently set intensity by a predetermined amount.

8. The animal training system according to claim 4, wherein the user input device of the remote controller comprises a dial to adjust the intensity of vibration stimulation to be delivered to the animal, and
the plurality of stimulation modes includes an instant mode in which the vibration stimulation is delivered to the animal with the intensity of vibration stimulation set by the dial by manipulating only the dial for a preset time.

9. The animal training system according to claim 4, wherein the animal training apparatus further comprises a lighting device, and
the plurality of functions includes a function of lighting the lighting device by the remote controller.

10. The animal training system according to claim 4, wherein the remote controller further comprises a beeper, and
the plurality of functions includes a function of activating the beeper when a preset time passes.

* * * * *